(12) United States Patent
Shirai et al.

(10) Patent No.: US 9,853,427 B2
(45) Date of Patent: Dec. 26, 2017

(54) RESIN-COATED WIRE HARNESS PIPE

(71) Applicants: UACJ Corporation, Tokyo (JP); Sumitomo Wiring Systems, Ltd., Mie (JP); Sumitomo Electric Fine Polymer, Inc., Osaka (JP)

(72) Inventors: Keita Shirai, Tokyo (JP); Ichio Takeda, Tokyo (JP); Makoto Yonemitsu, Tokyo (JP); Yoshichika Nishimura, Osaka (JP); Ryohei Fujita, Osaka (JP); Yuki Yabe, Osaka (JP); Tatsuya Miyazaki, Mie (JP)

(73) Assignees: UACJ CORPORATION, Tokyo (JP); SUMITOMO WIRING SYSTEMS, LTD., Mie (JP); SUMITOMO ELECTRIC FINE POLYMER, INC., Osaka (JP)

( * ) Notice: Subject to any disclaimer, the term of this patent is extended or adjusted under 35 U.S.C. 154(b) by 0 days.

(21) Appl. No.: 14/780,916

(22) PCT Filed: Mar. 27, 2014

(86) PCT No.: PCT/JP2014/058968
§ 371 (c)(1),
(2) Date: Sep. 28, 2015

(87) PCT Pub. No.: WO2014/157554
PCT Pub. Date: Oct. 2, 2014

(65) Prior Publication Data
US 2016/0072265 A1 Mar. 10, 2016

Related U.S. Application Data

(60) Provisional application No. 61/805,718, filed on Mar. 27, 2013.

(51) Int. Cl.
*F16L 57/00* (2006.01)
*H02G 3/04* (2006.01)
(Continued)

(52) U.S. Cl.
CPC ....... *H02G 3/0481* (2013.01); *B60R 16/0215* (2013.01); *F16L 9/006* (2013.01); *F16L 9/147* (2013.01); *H01B 7/0045* (2013.01)

(58) Field of Classification Search
CPC ....... F16L 9/147; F16L 9/12; Y10T 428/1393; B60R 16/0215
(Continued)

(56) References Cited

U.S. PATENT DOCUMENTS 4,181,775 A * 1/1980 Corke .................... C09J 177/00
174/DIG. 8
4,732,632 A * 3/1988 Pieslak .................... B05D 1/36
156/188

(Continued)

FOREIGN PATENT DOCUMENTS

JP H09324161 A 12/1997
JP H115268 A 1/1999
JP 2013042648 A 2/2013

OTHER PUBLICATIONS

International Preliminary Report on Patentability and English translation of the Written Opinion dated Sep. 29, 2015 for corresponding International Application No. PCT/JP2014/058968, filed Mar. 27, 2014.

(Continued)

*Primary Examiner* — Patrick F Brinson
(74) *Attorney, Agent, or Firm* — David D. Brush; Westman, Champlin & Koehler, P.A.

(57) ABSTRACT

A wire harness pipe includes an aluminum pipe, a heat shrink tube that coats the outer surface side of the aluminum (Continued)

pipe, and an adhesive layer that is disposed between the aluminum pipe and the heat shrink tube.

4 Claims, 1 Drawing Sheet

(51) Int. Cl.
    *B60R 16/02*     (2006.01)
    *F16L 9/00*     (2006.01)
    *F16L 9/147*     (2006.01)
    *H01B 7/00*     (2006.01)

(58) Field of Classification Search
    USPC ..... 138/141, 137, 139, 140; 248/36.1, 36.91
    See application file for complete search history.

(56) References Cited

U.S. PATENT DOCUMENTS

| | | | |
|---|---|---|---|
| 5,681,626 A * | 10/1997 | Hosokawa | B29C 61/0616 |
| | | | 138/141 |
| 9,393,755 B2 * | 7/2016 | Fukumoto | H02G 3/0481 |
| 2007/0128925 A1 | 6/2007 | Graeve et al. | |
| 2014/0165392 A1 | 6/2014 | Toyama et al. | |

OTHER PUBLICATIONS

English translation of U.S. Appl. No. 61/805,718, filed Mar. 27, 2013.
Japanese Office Action dated Feb. 23, 2016 for corresponding Japanese Patent Application No. 2015-50817 and its English Translation.
Japanese Office Action dated Feb. 23, 2016 for corresponding Japanese Patent Application No. 2015-508715 and its English Translation.
International Search Report dated Apr. 30, 2014 for corresponding International Application No. PCT/JP2014/058968 filed Mar. 27, 2013.
Chinese Office Action and English Translation dated Oct. 9, 2016 for Chinese Patent Application No. 201480017105.6.
Japanese Decision of Rejection and English Translation dated Sep. 13, 2016 for Japanese patent Application No. 2015-508715.
Chinese Office Action dated Jun. 2, 2017 for corresponding Chinese Patent Application No. 201480017105.6.
English Translation of Chinese Office Action dated Jun. 2, 2017 for corresponding Chinese Patent Application No. 201480017105.6.
Chinese Office Action dated Oct. 13, 2017 for corresponding Chinese Patent Application No. 201480017105.6.
English Translation of the relevent portion of the Chinese Office Action dated Oct. 13, 2017 for corresponding Chinese Patent Application No. 201480017105.6.

* cited by examiner

RESIN-COATED WIRE HARNESS PIPE

CROSS-REFERENCE TO RELATED APPLICATIONS

This Application is a Section 371 National Stage Application of International Application No. PCT/JP2014/058968, filed Mar. 27, 2014, the entire content of which is incorporated herein by reference, and published as WO 2014/157554 on Oct. 2, 2014, not in English, which claims the benefit of U.S. Provisional Patent Application No. 61/805,718 filed Mar. 27, 2013 in the U.S. Patent and Trademark Office, and the entire content of which is incorporated herein by reference.

TECHNICAL FIELD

The present invention relates to a metallic wire harness pipe for protecting a wire harness for an automobile and a method of producing the same.

BACKGROUND ART

A painted metallic pipe, such as of aluminum, is conventionally used as a wire harness pipe for protecting a wire harness from stone chips and rainwater.

The wire harness pipe is bent into various shapes when attached to an automobile. When the painted wire harness pipe is bent, its paint film peels off or cracks. In addition, there was a problem of a high manufacturing cost due to a need of paint facilities and waste disposal/liquid waste treatment facilities to carry out a painting process.

Thus, a method of coating a metallic pipe with a heat shrink tube was examined as disclosed in, for example, Japanese Unexamined Patent Application Publication No. 2013-42648.

PRIOR ART DOCUMENTS

Patent Documents

Patent Document 1: Japanese Unexamined Patent Application Publication No. 2013-42648

SUMMARY OF THE INVENTION

Problems to be Solved by the Invention

Nevertheless, this method was found impractical because cracks and peelings had occurred on the tube coating at the time of bending. In addition, when the tube coating had a flaw caused by a stone chip or the like, peelings sometimes occurred therefrom; thereby, problems could happen in corrosion resistance under a severe atmosphere of being loaded into a vehicle.

In one aspect of the present invention, it is favorable to provide a wire harness pipe with excellent bending workability.

Means for Solving the Problems

A wire harness pipe in one aspect of the present invention is explained hereinafter.

The wire harness pipe in one aspect of the present invention is a resin-coated harness pipe that is produced by coating the outer surface side of an aluminum alloy pipe (or simply called an aluminum pipe) with a heat shrink resin tube.

The wire harness pipe is characterized by comprising
an aluminum pipe,
a heat shrink tube that is coating the outer surface side of the aluminum pipe,
an adhesive layer that is placed between the aluminum pipe and the heat shrink tube, and
a wire harness surrounded by the aluminum pipe,
wherein the heat shrink tube comprises a polyolefin-based resin, and
wherein a thickness of the heat shrink tube after coating is within a range of 0.30mm to 0.50.

The adhesive layer may comprise an ethylene-vinyl acetate resin or an olefin-based elastomer resin. In addition, the adhesive layer is preferably an ethylene-vinyl acetate resin.

It is more preferable that the adhesive layer of the wire harness pipe comprises the ethylene-vinyl acetate resin and has a shear viscosity ranging from 1,000Pa·s to 100,000Pa·s when measured under the condition that the temperature is 200° C. and the shear rate is 1/s in accordance with JIS-K7199 (1999).

Note that the thickness of the heat shrink tube after the coating refers to a thickness of the heat shrink tube after the resin tube coats the outer surface of the aluminum pipe and is processed in heat-shrink treatment.

The adhesive layer has an adhesive ability of 7(N/10mm·0.1mm) or greater in the wire harness pipe, wherein the adhesive ability is a strength when a measured value obtained when the heat shrink tube coating the aluminum pipe, that is cut and raised for 10 mm in width, is pulled with a tensile testing machine at a tensile speed of 50 mm/s, becomes stable.

According to one aspect of the present invention, the adhesive layer that is present between the aluminum pipe and the heat shrink tube makes it possible to obtain a wire harness pipe having no peeling, crack, or crease on its coating at its bent parts after bending. Further, it is possible to obtain a wire harness pipe having no peeling or blister on its paint film (coating) despite a prolonged exposure to high temperature after bending. Moreover, it is possible to obtain a wire harness pipe having a tube that does not peel even if it has a flaw.

According to one aspect, the wire harness pipe further comprises a part of the wire harness pipe at which the aluminum pipe, heat shrink tube and adhesive layer are bent.

A method for manufacturing a wire harness pipe comprising: producing a tube coated aluminum pipe comprising an aluminum pipe, a heat shrink tube that coats an outer surface side of the aluminum pipe, and an adhesive layer that is disposed between the aluminum pipe and the heat shrink tube; and
bending the tube coated aluminum pipe.

BRIEF DESCRIPTION OF THE DRAWINGS

An embodiment of the present invention is explained hereinafter with reference to the drawings.

EXPLANATION OF REFERENCE NUMERALS

10 . . . wire harness pipe
11 . . . wire harness

12 . . . aluminum pipe
13 . . . adhesive layer
14 . . . heat shrink tube

MODE FOR CARRYING OUT THE INVENTION

Figure 1A:
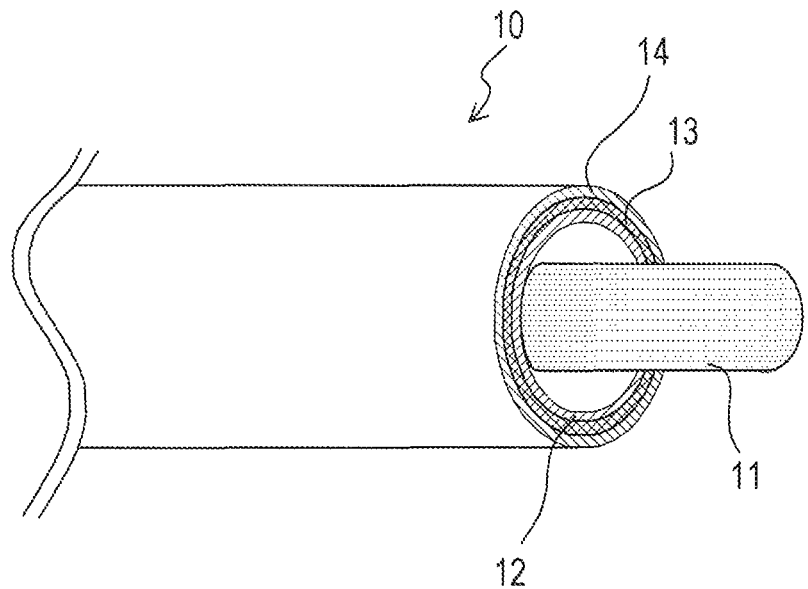
FIG. 1A is a schematic view illustrating a configuration of a wire harness pipe of a present embodiment.

FIG. 1A shows a configuration of a wire harness pipe 10 of a present embodiment. As shown in this drawing, the wire harness pipe 10 comprises therein a wire harness 11 for an automobile, and an aluminum pipe 12 surrounding the wire harness 11 to protect the wire harness 11.

Figure 1B:
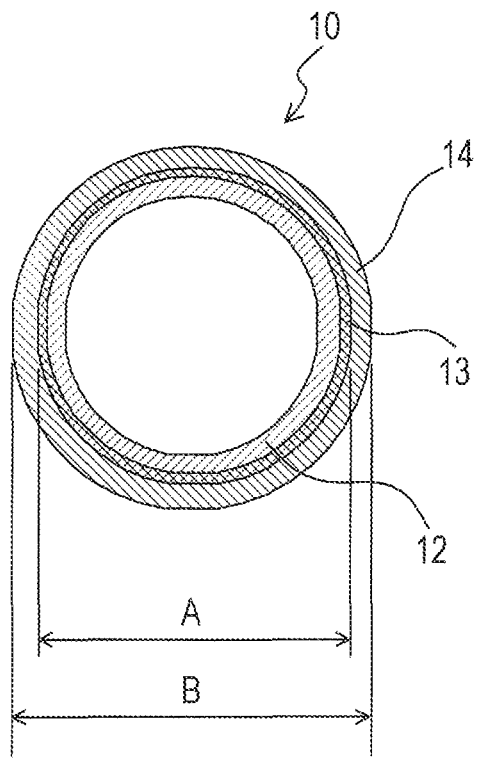
FIG. 1B is a cross-sectional view illustrating a cross-sectional configuration of an aluminum pipe and a coated section thereon of the wire harness pipe shown in FIG. 1A.

As shown in FIG. 1B, the wire harness pipe 10 of the present embodiment is provided with a heat shrink resin tube 14 on the outer surface side of the aluminum pipe 12 for coating the aluminum pipe 12. In addition, the wire harness pipe 10 is provided with an adhesive layer 13 between the heat shrink tube 14 and the aluminum pipe 12.

In other words, the wire harness pipe 10 of the present embodiment is made by coating the aluminum pipe 12 with the heat shrink tube 14, and comprises the aluminum pipe 12, the adhesive layer 13, and the heat shrink tube 14 layered in the said order.

The aluminum pipe 12 is a metallic pipe made of an aluminum alloy. Although any aluminum alloy may be applicable to the aluminum pipe 12, a JIS3000-series alloy or a JIS6000-series alloy is preferred.

The wall thickness of the aluminum pipe 12 preferably ranges from 1 mm to 1.5 mm.

In addition, surface roughness of the aluminum pipe may be appropriately determined to improve adhesion between the adhesive layer and the aluminum pipe.

An adhesive comprised in the adhesive layer 13 is preferably an ethylene-vinyl acetate (EVA) resin or an olefin-based elastomer resin (TPO).

If the adhesive layer 13 comprises an EVA resin, the shear viscosity of the adhesive layer 13 preferably ranges from 1,000 Pa·s to 100,000 Pa·s. With the shear viscosity of lower than 1,000 Pa·s, it is difficult to eliminate an air layer between an aluminum pipe and a heat shrink tube in a heating process of tube coating; thus, the tube has non-adhered portions and is prone to have creases at the time of bending. With the shear viscosity of greater than 100,000 Pa·s, an adhesive does not easily flow and could not exert high adhesive strength; thus, the tube is prone to have creases at the time of bending.

The shear viscosity can be altered depending on the molecular weight of Eva resin or the extent of cross-linking through electron irradiation or chemical cross-linking within the adhesive layer.

Examples of an olefin-based elastomer resin include a chlorinated polypropylene resin.

A resin comprised in the heat shrink tube 14 is favorably a polyolefin-based resin. Since the heat resistance of the polyolefin-based resin improves by cross-linking, the heating temperature for heat-shrinking in a production process of the wire harness pipe may be set high, for example, at approximately 200° C. Additionally, resin coatings of such resins as a polyester resin, a polypropylene sulfide-based resin, and a vinyl chloride resin could be peeled off or cracked if bending takes place after coating.

The heat shrink tube 14 preferably has a thickness ranging from 0.05 mm to 0.90 mm after coating the aluminum pipe 12 and being shrunk by heat (after coating). Note that the thickness of the heat shrink tube 14 as used herein refers to a value that is obtained from (B−A)/2 when A is an external diameter of the aluminum pipe 12 with a coating of the adhesive layer 13, and B is an external diameter of the wire harness pipe 10 after the aluminum pipe 12 is coated and the coating is shrunk by heat (see, FIG. 1B).

The heat shrink tube is easily creased at the time of bending, and easily damaged when being hit by a stone chip or the like if the thickness of the heat shrink tube is less than 0.05 mm. Additionally, scratch resistance may become weak if the thickness of the heat shrink tube is less than 0.05 mm.

It becomes difficult to bend the heat shrink tube and the cost of the heat shrink tube increases if the thickness of the heat shrink tube is greater than 0.90 mm.

The thickness of the heat shrink tube may be appropriately changed for the purpose of improving corrosion resistance of a wire harness pipe that is to be obtained.

With the wire harness pipe of the present embodiment, peelings, cracks, and creases at bent parts of a heat shrink tube film can be prevented at the time of bending. With the wire harness pipe of the present invention, flaws from stone chips can be prevented (in other words, chipping resistance can be improved).

To produce the wire harness pipe 10 of the present embodiment, the outer surface of the aluminum pipe 12 is covered by the adhesive layer 13 and the shrink tube 14; then, the heat shrink tube 14 is shrunk by heating. The heating temperature for this heating may be any temperature; nevertheless, if the heat shrink tube 14 comprises polyolefin, the heating temperature is preferably 160° C. or higher, and more preferably 200° C. or higher. The heating temperature of 160° C. or higher can improve adhesive strength between the heat shrink tube and the aluminum pipe; thereby, even when the heat shrink tube has a flaw, it is possible to inhibit the flaw from expanding or inhibit peelings of the heat shrink tube. The heating temperature of 200° C. or higher can improve the adhesive strength even further. In addition, the heating temperature is preferably 270° C. or lower, and more preferably 250° C. or lower. The heating temperature of 270° C. or lower can prevent the heat shrink tube from melting. The heating temperature of 250° C. or lower can inhibit discoloration of the heat shrink tube.

If the heat shrink tube 14 comprises resins other than polyolefin, the heating temperature preferably ranges from 100° C. to 200° C. The heating temperature of 100° C. or higher improves adhesive strength between the heat shrink tube and the aluminum pipe. The heating temperature of 200° C. or lower can prevent the heat shrink tube from melting.

A heating method can be any method; for example, a thermostatic chamber can be used.

The wire harness pipe 10 that is coated with the adhesive layer 13 and the heat shrink tube 14 can be produced with such production process as mentioned above.

EXAMPLES

Hereinafter, examples of the present invention are explained; however, the present invention is not limited thereto.

Example 1

In Example 1, an aluminum pipe (external diameter: 20 mm, wall thickness: 1.2 mm, length: 200 mm) that was made of JIS-A3003 alloy was covered, over its outer surface, by a heat shrink tube that had an inner diameter of 25.4 mm and had its inner surface coated with an adhesive of EVA (shear viscosity: 16000 Pa·s), and was placed into a thermostatic chamber heated to 200° C. A polyolefin-based resin was used as a material for the heat shrink tube. The aluminum pipe was taken out from the thermostatic chamber after 10 minutes, when the temperature of the aluminum pipe reached 200° C., left in the room temperature, and cooled.

An aluminum pipe that was coated with a heat shrink tube (hereinafter, also referred to as a tube-coated aluminum pipe) was produced by the above mentioned process; the aluminum pipe had the same configuration as the wire harness pipe of the present invention wherein an adhesive layer (EVA) was formed between the heat shrink tube and the aluminum pipe. The film thickness of the tube after heat shrinking was 0.30 mm.

Example 2

In Example 2, a tube-coated aluminum pipe was produced by using the same material and the same method as Example 1 except for using TPO as an adhesive. The film thickness of the tube after heat shrinking was 0.30 mm.

Example 3

In Example 3, a tube-coated aluminum pipe was produced by using the same material and the same method as Example 1 except for using a vinyl chloride resin as a material for the heat shrink tube, using an EVA with shear viscosity of 5800 Pa·s for an adhesive layer, and for heating the temperature of the thermostatic chamber to 160° C. The film thickness of the tube after heat shrinking was 0.30 mm.

Example 4

In Example 4, a tube-coated aluminum pipe was produced by using the same material and the same method as Example 1 except for using a polyester resin as a material for the heat shrink tube, and for heating the temperature of the thermostatic chamber to 160° C. The film thickness of the tube after heat shrinking was 0.25 mm.

Example 5

In Example 5, a tube-coated aluminum pipe was produced by using the same material and the same method as Example 1 except for heating the temperature of the thermostatic chamber to 160° C. The film thickness of the tube after heat shrinking was 0.30 mm.

Example 6

In Example 6, a tube-coated aluminum pipe was produced by using the same material and the same method as Example 1 except for using an EVA with shear viscosity of 5800 Pa·s for the adhesive layer, and for heating the temperature of the thermostatic chamber to 110° C. The film thickness of the tube after heat shrinking was 0.30 mm

Example 7

In Example 7, a tube-coated aluminum pipe was produced by using the same material and the same method as Example 1 except for heating the temperature of the thermostatic chamber to 230° C. The film thickness of the tube after heat shrinking was 0.30 mm.

Example 8

In Example 8, a tube-coated aluminum pipe was produced by using the same material and the same method as Example 1 except for using an EVA with shear viscosity of 5800 Pa·s for the adhesive layer, and for changing the film thickness of the heat shrink tube to be used. The film thickness of the tube after heat shrinking was 0.05 mm.

Example 9

In Example 9, a tube-coated aluminum pipe was produced by using the same material and the same method as Example 1 except for changing the film thickness of the heat shrink tube to be used. The film thickness of the tube after heat shrinking was 0.50 mm.

Example 10

In Example 10, a tube-coated aluminum pipe was produced by using the same material and the same method as Example 1 except for using an EVA with shear viscosity of 5800 Pa·s for the adhesive layer, and for changing the film thickness of the heat shrink tube to be used. The film thickness of the tube after heat shrinking was 0.10 mm.

Example 11

In Example 11, a tube-coated aluminum pipe was produced by using the same material and the same method as Example 1 except for changing the shear viscosity of the adhesive for the heat shrink tube to be used to 16000 Pa·s. The film thickness of the tube after heat shrinking was 0.30 mm.

Example 12

In Example 12, a tube-coated aluminum pipe was produced by using the same material and the same method as Example 1 except for changing the shear viscosity of the adhesive for the heat shrink tube to be used to 1900 Pa·s. The film thickness of the tube after heat shrinking was 0.30 mm.

Example 13

In Example 13, a tube-coated aluminum pipe was produced by using the same material and the same method as Example 1 except for changing the shear viscosity of the adhesive for the heat shrink tube to be used to 300 Pa·s. The film thickness of the tube after heat shrinking was 0.10 mm.

Example 14

In Example 14, a tube-coated aluminum pipe was produced by using the same material and the same method as Example 1 except for changing the shear viscosity of the adhesive for the heat shrink tube to be used to 50000 Pa·s. The film thickness of the tube after heat shrinking was 0.10 mm.

Example 15

In Example 15, a tube-coated aluminum pipe was produced by using the same material and the same method as Example 1 except for changing the shear viscosity of the adhesive for the heat shrink tube to be used to 100000 Pa·s.

The film thickness of the tube after heat shrinking was 0.10 mm.

Comparative Example 1

In Comparative Example 1, a tube-coated aluminum pipe was produced by using the same material and the same method as Example 1 except for not using an adhesive. The film thickness of the tube after heat shrinking was 0.30 mm.

Comparative Example 2

In Comparative Example 2, a tube-coated aluminum pipe was produced by using the same material and the same method as Example 1 except for using a polyester resin as a material for the heat shrink tube, for not using an adhesive, and for heating the temperature of the thermostatic chamber to 160° C. The film thickness of the tube after heat shrinking was 0.30 mm.

Comparative Example 3

In Comparative Example 3, a tube-coated aluminum pipe was produced by using the same material and the same method as Example 1 except for using a vinyl chloride resin as a material for the heat shrink tube, for not using an adhesive, and for heating the temperature of the thermostatic chamber to 160° C. The film thickness of the tube after heat shrinking was 0.30 mm.

Comparative Example 4

In Comparative Example 4, a tube-coated aluminum pipe was produced by using the same material and the same method as Example 1 except for using a polypropylene sulfide resin as a material for the heat shrink tube, for not using an adhesive, and for heating the temperature of the thermostatic chamber to 160° C. The film thickness of the tube after heat shrinking was 0.30 mm.

Comparative Example 5

In Comparative Example 5, a coated aluminum pipe was produced by forming a resin coating on an aluminum pipe by painting an epoxy/polyester resin as a substitute for the heat shrink tube, and then shrinking the coating by heat using the thermostatic chamber heated to 160° C. in the same manner as the examples and comparative examples described above. The film thickness of the paint film after heat shrinking was 0.10 mm.

Among the examples and the comparative examples mentioned above, bending tests were conducted in the following manner using the tube-coated aluminum pipes that were produced in Examples 1-3 and Comparative Examples 1-4.

(Bending Test)

A bending test was conducted on the tube-coated aluminum pipes. The heat shrink tubes at the bent parts were then checked for creases on the inner side or cracks on the outer side. The results are shown on Table 1 below. On Table 1, marks are given to the results of the bending test: ○ for good, Δ for slightly defective, and × for defective.

TABLE 1

| | Tube Material | Adhesive | Adhesive Shear Viscosity (Pa·s) | Heating Temperature (° C.) | Film Thickness of Tube after Shrinking (mm) | Bending Test Result |
|---|---|---|---|---|---|---|
| Example 1 | Polyolefin | EVA | 16000 | 200 | 0.30 | ○ |
| Example 2 | Polyolefin | TPO | — | 200 | 0.30 | ○ |
| Example 3 | Vinyl chloride | EVA | 5800 | 160 | 0.30 | ○ |
| Comparative Example 1 | Polyolefin | none | — | 200 | 0.30 | Δ |
| Comparative Example 2 | Polyester | none | — | 160 | 0.30 | X |
| Comparative Example 3 | Vinyl chloride | none | — | 160 | 0.30 | X |
| Comparative Example 4 | Polypropylene sulfide | none | — | 160 | 0.30 | X |

As shown on Table 1, good results were obtained for the tube-coated aluminum pipes using a polyolefin-based resin tube with an adhesive as no creases and cracks were found at the bent parts thereof.

Although not shown on Table 1, a minute crease was found at the bent part of the tube-coated aluminum pipe of Example 13. It was possibly because the adhesive used therein had shear viscosity of less than 1000 Pa·s.

Among the examples and the comparative examples mentioned above, adhesive strength measuring tests and cracking tests were conducted in the following manners on the tube-coated aluminum pipes that were produced in Examples 1, 5, 6, 7, and Comparative Example 1.

(Adhesive Strength Measuring Test)

The heat shrink tubes on the surfaces of the tube-coated aluminum pipes were cut and raised for 10 mm in width and tested on a tensile testing machine (STROGRAPH M50: product of SHINTO Scientific Co., ltd.) to measure a force that stabilizes the tensioning value at the tensile speed of 50 mm/s; the force was defined as an adhesive strength value (N/10 mm). The value provided by dividing the adhesive strength value by the film thickness of the tube after heat shrinking was defined as an adhesive ability (N/10 mm×0.1 mm).

(Cracking Test)

The tube-coated aluminum pipes were cut with a cutter knife to make incisions, and then placed in a thermostatic chamber set to 140° C. The tube-coated aluminum pipes were taken out from the chamber 30 hours later and cooled spontaneously, and then the surface condition thereof was observed.

The results of these tests are shown on Table 2 below.

TABLE 2

| | Tube Material | Adhesive | Adhesive Shear Viscosity (Pa · s) | Heating Temperature (° C.) | Film Thickness of Tube after Shrinking (mm) | Adhesive Strength (N/10 mm) | Adhesive Ability (N/10 mm · 0.1 mm) | External Appearance after Cracking Test |
|---|---|---|---|---|---|---|---|---|
| Example 1 | Polyolefin | EVA | 5800 | 200 | 0.30 | 20 | 7 | No crack expansion on tube |
| Example 5 | Polyolefin | EVA | 16000 | 160 | 0.30 | 16 | 5 | Tube peeled |
| Example 6 | Polyolefin | EVA | 5800 | 110 | 0.30 | 7 | 2 | Tube peeled |
| Example 7 | Polyolefin | EVA | 16000 | 230 | 0.30 | 33 | 11 | No crack expansion on tube |
| Comparative Example 1 | Polyolefin | none | — | 200 | 0.30 | 18 | 6 | Tube peeled |

As shown on Table 2, the adhesive strength between the aluminum pipes and the heat shrink tubes were able to be improved by raising the heating temperature high at the time of heat shrinking. With the adhesive ability of 7(N/10 mm·0.1 mm) or greater, it was possible to inhibit expansion of cracks on the tubes in the cracking test. As for the tube-coated aluminum pipe without an adhesive, it was found that the adhesive strength was decreased and the tube was peeled after the cracking test even with a high heating temperature (200° C.).

Among the examples and the comparative examples mentioned above, cracking tests in the manner described above and scratching tests in the manner described below were conducted on the tube-coated aluminum pipes that were produced in Examples 1, 8, 9, 10, 11, 12, 13, 14, and 15, and on the painted aluminum pipe in Comparative Example 5.

(Scratching Test)

A scratching test was conducted on the surfaces of the tube-coated aluminum pipes using a HEIDON testing machine (HHS-2000: product of Toyo Seiki Seisaku-sho. Ltd.) with a scriber (hardness: HRA90). A force at which the scriber reached the aluminum pipe when scratching was measured and defined as a scratch resistance (g).

The results are shown on Table 2 below.

TABLE 3

| | Tube Material | Adhesive | Adhesive Shear Viscosity (Pa · s) | Heating Temperature (° C.) | Film Thickness of Tube after Shrinking (mm) | External Appearance after Cracking Test | Scratch Resistance (g) |
|---|---|---|---|---|---|---|---|
| Example 1 | Polyolefin | EVA | 5800 | 200 | 0.30 | No crack expansion on tube | 1500 |
| Example 8 | Polyolefin | EVA | 16000 | 200 | 0.05 | No crack expansion on tube | 200 |
| Example 9 | Polyolefin | EVA | 5800 | 200 | 0.50 | No crack expansion on tube | 1800 |
| Example 10 | Polyolefin | EVA | 5800 | 200 | 0.10 | No crack expansion on tube | 350 |
| Example 11 | Polyolefin | EVA | 16000 | 200 | 0.30 | No crack expansion on tube | 1500 |
| Example 12 | Polyolefin | EVA | 1900 | 200 | 0.30 | No crack expansion on tube | 1500 |
| Example 13 | Polyolefin | EVA | 300 | 200 | 0.30 | No crack expansion on tube | 1500 |
| Example 14 | Polyolefin | EVA | 50000 | 200 | 0.30 | No crack expansion on tube | 1500 |
| Example 15 | Polyolefin | EVA | 100000 | 200 | 0.30 | No crack expansion on tube | 1500 |
| Comparative Example 5 | Epoxy/polyester (paint) | none | — | 160 | 0.10 | Paint film peeled | 200 |

As shown on Table 3, it was found that a high scratch resistance could be obtained when the coating tube was made of polyolefin compared with a case with a conventional tube that was painted with epoxy/polyester paint even with the same film thickness.

The embodiments and the examples of the present invention are as explained above; nevertheless, the present invention is not limited to the embodiments and examples as described above, and may be carried out in various modes within the scope of the spirit of the present invention.

The invention claimed is:

1. A wire harness pipe comprising:
an aluminum pipe;
a heat shrink tube that coats an outer surface side of the aluminum pipe;
an adhesive layer that is disposed between the aluminum pipe and the heat shrink tube; and
a wire harness surrounded by the aluminum pipe,
wherein the heat shrink tube comprises a polyolefin-based resin, and
wherein a thickness of the heat shrink tube after coating is within a range of 0.30mm to 0.50 mm.

2. The wire harness pipe of claim 1 wherein the adhesive layer comprises an ethylene-vinyl acetate resin or an olefin-based elastomer resin.

3. The wire harness pipe of claim 1 wherein the adhesive layer comprises the ethylene-vinyl acetate resin and has a shear viscosity ranging from 1,000 to 100,000 (Pa·s) at a temperature of 200° C. and at a shear rate of 1/s.

4. The wire harness pipe of claim 1 wherein the adhesive layer has an adhesive ability of 7 (N/10mm·0.1mm) or greater, wherein the adhesive ability is a strength when a measured value obtained when the heat shrink tube coating the aluminum pipe, that is cut and raised for 10 mm in width, is pulled with a tensile testing machine at a tensile speed of 50 mm/s, becomes stable.

* * * * *